United States Patent
Sauvage-Vincent et al.

(10) Patent No.: US 9,884,506 B2
(45) Date of Patent: Feb. 6, 2018

(54) OPTICAL SECURITY COMPONENT HAVING A REFLECTIVE EFFECT, MANUFACTURE OF SAID COMPONENT, AND SECURED DOCUMENT PROVIDED WITH SUCH A COMPONENT

(71) Applicant: Hologram.Industries, Bussy Saint Georges (FR)

(72) Inventors: Jean Sauvage-Vincent, Saint Maur les Fosses (FR); Valery Petiton, Vendrest (FR)

(73) Assignee: Hologram.Industries, Bussy Saint Georges (FR)

( * ) Notice: Subject to any disclaimer, the term of this patent is extended or adjusted under 35 U.S.C. 154(b) by 55 days.

(21) Appl. No.: 14/354,838

(22) PCT Filed: Oct. 26, 2012

(86) PCT No.: PCT/EP2012/071210
§ 371 (c)(1),
(2) Date: Apr. 28, 2014

(87) PCT Pub. No.: WO2013/060817
PCT Pub. Date: May 2, 2013

(65) Prior Publication Data
US 2014/0285892 A1    Sep. 25, 2014

(30) Foreign Application Priority Data
Oct. 28, 2011    (FR) ...................................... 11 59796

(51) Int. Cl.
*B42D 25/328*    (2014.01)
*B42D 25/351*    (2014.01)
(Continued)

(52) U.S. Cl.
CPC ........... *B42D 25/351* (2014.10); *B42D 25/29* (2014.10); *B42D 25/355* (2014.10); *G02B 5/008* (2013.01);
(Continued)

(58) Field of Classification Search
CPC ............................. B42D 25/328; G02B 5/008
(Continued)

(56) References Cited

U.S. PATENT DOCUMENTS

| | | | |
|---|---|---|---|
| 6,600,603 B1 * | 7/2003 | Sambles ................ | G02B 5/008 283/91 |
| 6,870,678 B2 * | 3/2005 | Tompkin .............. | G02B 5/1842 359/569 |

(Continued)

FOREIGN PATENT DOCUMENTS

| | | |
|---|---|---|
| DE | 10 2007 016394 A1 | 10/2008 |
| DE | 10 2007 061979 A1 | 6/2009 |

(Continued)

OTHER PUBLICATIONS

International Search Report issued in PCT/EP2012/071210 dated Jan. 7, 2013 (6 pages).

(Continued)

Primary Examiner — Kyle Grabowski
(74) Attorney, Agent, or Firm — Osha Liang LLP

(57) ABSTRACT

According to one aspect, the invention relates to an optical security component (10) intended to be observed in a spectral band between 380 and 780 nm and in direct reflection mode, comprising:
   a layer of dielectric material (101), transparent in said observation spectral band,
   a continuous metallic layer (102) forming, with said layer of dielectric material, a metal-dielectric interface, having a sufficient thickness (t) to allow the reflection of
(Continued)

the incident light on said interface in the observation spectral band with a maximum residual transmission as a function of the wavelength of 2%, and structured at said interface to form, in a first coupling area, two sets of undulations extending in two directions and forming a first grating with two dimensions, of subwavelength periods ($\Lambda_1$, $\Lambda_2$) in each of the directions.

16 Claims, 7 Drawing Sheets

(51) Int. Cl.
*G02B 5/00* (2006.01)
*G02B 5/18* (2006.01)
*G09F 3/00* (2006.01)
*B42D 25/29* (2014.01)
*B42D 25/355* (2014.01)
*B42D 25/324* (2014.01)

(52) U.S. Cl.
CPC ......... *G02B 5/1809* (2013.01); *G02B 5/1861* (2013.01); *G09F 3/0294* (2013.01); *B42D 25/324* (2014.10); *B42D 25/328* (2014.10); *B42D 2033/10* (2013.01); *B42D 2035/20* (2013.01)

(58) Field of Classification Search
USPC .................................................. 359/567, 574
See application file for complete search history.

(56) References Cited

U.S. PATENT DOCUMENTS

2004/0239099 A1* 12/2004 Tompkin ................ B42D 25/00
283/74
2007/0147221 A1* 6/2007 Parriaux ............ G01D 5/34707
369/275.4
2010/0307705 A1* 12/2010 Rahm .................... B42D 25/00
428/156

FOREIGN PATENT DOCUMENTS

| DE | WO 2009083151 A1 * | 7/2009 | ............ B42D 25/29 |
| EP | 2 128 665 A1 | 12/2009 | |
| FR | 2509873 A1 | 1/1983 | |
| WO | 01/44839 A1 | 6/2001 | |
| WO | WO2006013215 | * 2/2006 | |
| WO | WO2010063737 | * 6/2010 | |

OTHER PUBLICATIONS

Tompkin, W.R. et al.; "Zero-Order Gratings for Optically Variable Devices"; Proceedings of SPIE, vol. 4677, Apr. 1, 2002, pp. 227-237 (11 pages).

Lim, Y. et al.; "Wavelength-Band Selection Filter Based on Surface Plasmon Resonance and Phase Conjugation Holography"; IEEE Photonics Technology Letters, vol. 18, No. 23, Dec. 1, 2006, pp. 2532-2534 (3 pages).

Popov, E. et al.; "Total absorption of unpolarized light by crossed gratings"; Optics Express, vol. 16, No. 9, Apr. 28, 2008, pp. 6146-6155 (10 pages).

Written Opinion of the International Searching Authority issued in PCT/EP2012/071210 dated Jan. 7, 2013 (6 pages).

International Preliminary Report on Patentability from PCT/EP2012/071210 dated Jan. 29, 2014 (26 pages).

* cited by examiner

OPTICAL SECURITY COMPONENT HAVING A REFLECTIVE EFFECT, MANUFACTURE OF SAID COMPONENT, AND SECURED DOCUMENT PROVIDED WITH SUCH A COMPONENT

FIELD OF THE INVENTION

The present invention relates to the field of security marking. More particularly, it relates to an optical security component with reflective effect for checking the authenticity of a document, a method for fabricating such a component and a secured document equipped with such a document.

STATE OF THE ART

Numerous technologies are known for authenticating documents or products, and notably for securing documents such as documents of value of the type of bank notes, passports or other identification documents. These technologies target the production of optical security components whose optical effects as a function of the observation parameters (orientation relative to the observation axis, position and dimensions of the light source, etc.) assume highly characteristic and verifiable configurations. The general aim of these optical components is to provide novel and differentiated effects, from physical configurations that are difficult to reproduce.

Among these components, DOVID (Diffractive Optical Variable Image Device) is used to denote the optical components that produce diffractive and variable images that are commonly called holograms. These components are generally observed in reflection mode. Among these components, some exhibit zero order observable optical effects, that is to say observable in direct reflection mode, allowing simpler authentication by a public uninitiated in grating optics.

Among the optical components that can be observed in direct reflection mode, an optical security component is, for example, known that comprises a high-index layer encapsulated between two lower-index layers and structured to form a subwavelength grating. Such a component, called DID (Diffractive Identification Device) is, for example, described in the application FR 2 509 873. It behaves like a structured waveguide making it possible to excite guided resonances at different wavelengths as a function of the polarization. In reflection mode, such a component thus behaves like a bandpass filter, forming a colored mirror whose color varies with the direction of observation.

The article "Zero-order Gratings for Optically Variable Devices" by W. R. Thompkin et al. (Proceedings of SPIE Vol. 4677 (2002)) also describes optical security components of DID type that have zero-order observable subwavelength period gratings. The gratings described have one or two dimensions, either uniform or with variable pitch to create additional optical effects. The article also describes components that combine zero-order observable gratings with gratings having wider periods to allow novel diffraction properties and shows the influence of the polarization of the incident wave in such combined structures, notably allowing for variable optical effects with an azimuthal rotation of the component.

The document DE 10 2007 061979 describes a security element for secured documents implementing metallic nanostructures. In particular, by proceeding with an oblique-flux sputtering of a metal on a structured layer of dielectric material, how the reflection and the transmission of the security elements can vary in wavelength as a function of the metal sputtering angle is explained.

The present invention presents an optical security component that can be checked in zero-order reflection mode and by the naked eye by an observer, said component implementing plasmonic resonances in order to exhibit noteworthy optical effects to allow an uninitiated user to check authentication with a maximum of comfort and very high reliability.

SUMMARY OF THE INVENTION

According to a first aspect, the invention relates to an optical security component intended to be observed in a spectral band between 380 and 780 nm and in direct reflection mode, comprising:
  a layer of dielectric material, transparent in said observation spectral band,
  a continuous metallic layer forming, with said layer of dielectric material, a metal-dielectric interface, having a sufficient thickness to allow the reflection of the incident light on said interface in the observation spectral band with a residual maximum transmission as a function of the wavelength of 2%, and structured at said interface to form, in a first coupling area, two sets of undulations extending in two directions and forming a first coupling grating with two dimensions, of subwavelength periods in each of the directions.

The applicant has demonstrated, in a component thus produced, original and contrasting color variation effects, either by azimuthal rotation of the component, or by axial translation of the component. These noteworthy effects can be explained by plasmonic resonance effects at the metal-dielectric interface, which allow for the production of a band-stop reflection mode filter, variable as a function of the observation conditions, and exhibiting a good tolerance as a function of the angle of incidence.

The duly formed two-dimensional grating can be defined by the superposition of two sets of periodic undulations extending in two directions. It is then possible to define, for each set of undulations, a grating vector, with a direction at right angles to the undulations and with a norm inversely proportional to the period.

Advantageously, the profile of the grating in one dimension is sinusoidal, or more generally continuously varying, this type of profile notably allowing for a better propagation of the plasmonic modes.

Advantageously, the directions of the grating vectors are at right angles to ±3%, making it possible to create a contracting colored effect, visible in two azimuthal orientations at right angles to one another.

According to a variant, the norms of the grating vectors are identical, making it possible to create a colored effect that is stable in rotation. Alternatively, the norms of the grating vectors, and therefore the periods, are different, making it possible to create a colored effect that can be varied by azimuthal rotation.

According to a variant, the metallic layer is structured to form, in a first coupling area, a first two-dimensional grating and, in a second coupling area, a second two-dimensional grating. Such a structuring makes it possible to create colored patterns on variable colored backgrounds, making authentication easier.

Advantageously, said areas form complementary patterns, for example a recognizable shape, to further simplify the authentication.

Advantageously, each of the two gratings has grating vectors whose directions are at right angles, and the directions of the grating vectors of the first grating are parallel to the directions of the grating vectors of the second grating. Such an arrangement allows for a maximum contrast of the colored effect by 90° azimuthal rotation of the component.

According to a first variant, the period in one direction of a first grating is identical to the period in the other direction of the second grating. This configuration makes it possible to generate color reversals between the pattern and the background.

According to a second variant, the periods in the first and the second directions of the first grating are identical and the period in one direction of the second grating is identical to said period of the first grating. This configuration makes it possible, for example, to keep a colored background that is stable in rotation and present a pattern whose color differs from that of the background only in a given azimuthal position.

Advantageously, the periods of said grating(s) is (/are) between 200 nm and 550 nm.

Advantageously, the depth of the grating is proportional to a ratio of the period of the grating of 10 to 50% and preferentially 10% to 40%.

Advantageously, at least a part of the metallic layer is formed in aluminum and its thickness is equal to or greater than 30 nm.

According to a variant, the metallic layer comprises at least two parts each formed by a different metal. This configuration makes it possible to modify the colored effects, the nature of the metal acting on the plasmonic resonances.

Advantageously, the optical security component also comprises a coverlayer in contact with said metallic layer on its face opposite said metal-dielectric interface, for example an adhesion layer intended for the adhesion of said component with a substrate.

According to a second aspect, the invention relates to an optical security element intended to secure a document and comprising at least one optical security component according to the first aspect.

According to a variant, said optical element also comprises non-metalized areas. These non-metalized areas will notably make it possible to better demonstrate the effects of the component(s) according to the first aspect.

According to a third aspect, the invention relates to a secured document or object comprising a substrate and an optical security element according to the second aspect fixed onto said substrate.

According to a fourth aspect, the invention relates to a method for fabricating an optical security component intended to be observed in a spectral band between 380 and 780 nm and in direct reflection mode, said method comprising:

the provision of a layer of dielectric material, transparent in said observation spectral band and the structuring of said layer of dielectric material to form, in a first coupling area, two sets of undulations extending in two directions and forming a first grating with two dimensions, of subwavelength periods in each of the directions, the deposition of a continuous metallic layer on said layer of dielectric material to form, with said layer of dielectric material, a structured metal-dielectric interface, said metallic layer having a sufficient thickness to allow the reflection of the incident light on said interface in the observation spectral band with a maximum residual transmission as a function of the wavelength of 2%.

This method notably offers the advantage of being compatible with the methods for fabricating optical security components known from the prior art, notably the components of DOVID type.

Advantageously, said layer of metallic material is covered by a coverlayer on its face opposite said structured metal-dielectric interface.

BRIEF DESCRIPTION OF THE FIGURES

Other features and advantages of the invention will become apparent on reading the following description, illustrated by the figures in which.

DETAILED DESCRIPTION

Figure 1A:
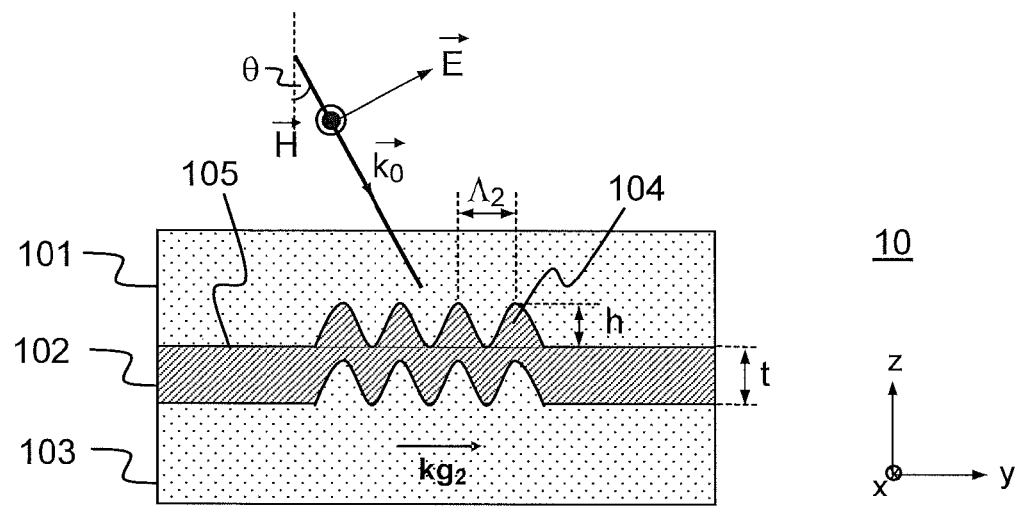
FIGS. 1A and 1B, partial views, respectively on a cross-sectional plane and from above, of an optical security component according to the invention.
Figure 1B:
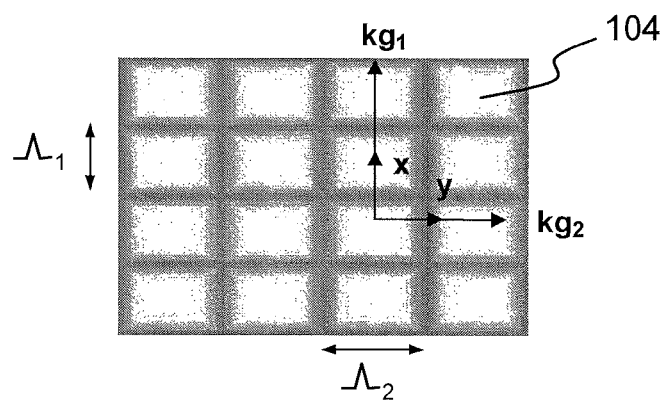

FIGS. 1A and 1B represent, by partial views, respectively a cross-sectional view and a plan view of a security component 10 according to an exemplary embodiment of the invention.

The security component according to the invention generally comprises a layer of dielectric material 101 and a continuous metallic layer 102 forming, with the layer of dielectric material, a dielectric-metal interface 105. The metal can be any metal that can withstand a plasmonic resonance, and, preferentially, silver, aluminum, gold, chrome, copper. The thickness t of the metallic layer, substantially constant, is chosen to be sufficiently thick according to the nature of the metal to allow the quasi-total reflection of the incident light in the observation spectral band, the maximum residual transmission as a function of the wavelength being 2%. Typically, the thickness of the metallic layer is chosen to be greater than 30 nm for a metallic layer of aluminum and greater than 90 nm for a metallic layer of silver. The thickness of the metallic layer is limited only by considerations associated with the technology and cost (typically a few hundred nanometers to one or two microns). The optical security component 10 may also comprise a layer 103 in contact with the metallic layer on its face facing the dielectric-metal interface 105. The layer 103 is, for example, a layer exhibiting an adhesive function with a support (not represented). The dielectric material forming the layer 101 may be any material allowing a "non-destructive association" with the metal, that is to say with no risk of provoking a physico-chemical reaction, for example of oxidation type, which would degrade the effect to be checked. "Dielectric material" should be understood generally to mean a material or a stack of materials whose dielectric permittivity has a real part that is positive and an imaginary part that is nil or very low compared to the real part. The layer of dielectric material 101 may notably be formed by a dielectric multilayer, a metal-dielectric multilayer or a layer of dielectric material comprising metallic nanoparticles. According to one example, the layer 101 of dielectric material is a layer of polymer material intended to be embossed and the layer 103 is a polymer-type encapsulation layer.

It is known that, at the interface between a conductive material, for example a metal, and a dielectric material, a surface electromagnetic wave may be propagated that is associated with a collective oscillation of electrons on the surface, called surface plasmon. This phenomenon is, for example, described in the basic work by H. Raether ("Surface plasmons", Springer-Verlag, Berlin Heidelberg). The coupling of an incident light wave with a plasmonic mode can be obtained in different ways, notably by the structuring of the interface to form a coupling grating.

This basic principle is implemented in the security component according to the invention to obtain noteworthy effects in reflection mode.

In the security component 10, the metallic layer 102 is structured to form, on at least a part of its surface, called coupling area, at least one first coupling grating 104 with two dimensions, of subwavelength period in each of the directions. Such a grating is illustrated by a plan view in FIG. 1B. It is formed by two sets of undulations extending in two directions at right angles to form a two-dimensional structure. The metallic layer is continuous, deformed on the coupling area so as to form said grating. The grating is characterized by the pitch (or period), respectively $\Lambda_1$, $\Lambda_2$ of each set of undulations and the depth or amplitude h of the undulation (defined as the height between the peak and the dip). The pitch of the grating in each of the directions is subwavelength, typically between 100 nm and 600 nm, advantageously between 200 nm and 550 nm, determined to optimize the coupling of an incident light wave of given angle of incidence and of given wavelength contained in the observation spectral band with a plasmonic mode that is propagated on the metal-dielectric interface. The depth is between 10% and 50% of the pitch of the grating, advantageously between 10% and 40%. The profile of the undulations is advantageously sinusoidal or quasi-sinusoidal, or more generally continuously varying, this type of profile allowing a better propagation of the plasmonic modes and being compatible with photolithography-based fabrication methods. In each direction, a grating vector $k_{gi}$ is defined, with a direction at right angles to the lines of the grating and with a norm defined by $k_{gi}=2\pi/\Lambda_i$ where $\Lambda_i$ is the pitch of the grating in the direction considered.

It is shown that such a structure exhibits a different response as a function of the polarization of the incident wave.

An incident wave is first considered that has a polarization TM (transverse magnetic wave, that is to say for which the magnetic field H is at right angles to the plane of incidence yz which is the plane of the figure in FIG. 1A) incident on the grating with an azimuth of 0° relative to the grating defined by the grating vector $k_{g2}$ and an angle of incidence θ in the layer 103 relative to the axis z normal to the plane of the grating formed by the undulations 104. For there to be coupling, that is to say transfer of energy between the incident wave in a dielectric medium of relative permittivity Ed and the plasmonic mode, it is demonstrated that the following equality must be satisfied (see H. Raether, cited previously):

$$k_{sp}=n_1 k_0 \sin\theta + p \cdot k_{g2} \quad (1)$$

In which:
p is the evanescent diffracted order
$k_0$ is the wave number defined by $k_0=2\pi/\lambda$
$k_{sp}$ is defined by $k_{sp}=n_{sp}k_0$, in which $n_{sp}$ is the effective index of the plasmon, given by $$n_{sp}=\sqrt{\in m \in d/(\in m + \in d)} \quad (2)$$

in the case of a metallic layer of infinite thickness with ∈m and ∈d the permittivities of the metal and of the dielectric material respectively.

It is thus possible to define a central coupling wavelength $\lambda_0$ for an observation of the component according to a standard angle of incidence $\theta_0$, typically according to an angle of 30° which is the observation angle referenced as being the typical position for an observation of a hologram. The central coupling wavelength is defined by:

$$\lambda_{02}=(\Lambda_2/p)*(n_{sp}-n_1*\sin(\theta_0)) \quad (3)$$

In a spectral band centered on the central coupling wavelength, the incident light energy in the dielectric medium is coupled with the plasmonic mode, leading to the absorption of this energy in the metallic layer 102. The result thereof is a modification of the spectrum of the reflected light energy. The optical security component thus behaves like a color band-stop filter for an incident radiation in TM mode.

Now consider an incident wave with the same angle of incidence but a TE polarization (transverse electrical wave, that is to say for which the electrical field E is at right angles to the plane of incidence yz which is the plane of the figure in figure X), and consider the grating of grating vector $k_{g1}$ (FIGS. 1A, 1B), at 90° to the first grating presented (grating of grating vector $k_{g2}$). A plasmonic excitation will then be possible if the incident wave fulfils the coupling conditions such that:

$$k_{sp}=((k_0*n_1*\sin(\theta_0))^2+(p*k_{g1})^2)^{1/2} \quad (4)$$

It is then possible to define a new central coupling wavelength, independent of the first because of its opposite polarization such as:

$$\lambda_{01}=(\Lambda_1/|p|)*(n_{sp}^2-n_1^2*\sin^2\theta_0)^{1/2} \quad (5)$$

Thus, for a non-polarized incident wave, a part of the incident radiation will be coupled with a plasmonic mode by virtue of a set of undulations in one direction, and another part of the radiation will be coupled with a plasmonic mode by virtue of the set of undulations in another direction, resulting in the absorption in the metallic layer of two independent spectral bands. To this end, a loss of the flux observed in direct reflection mode (that is to say zero order) is added, due to the diffraction in the higher diffraction orders, resulting, in addition to the color variations due to the coupling with plasmonic modes, in a lowering of intensity of the flux reflected at the diffracted wavelengths.

The different physical mechanisms implemented in the optical security component according to the invention make it possible to obtain original colored effects, that are easy to check and tolerant in terms of angle of incidence, the eye being less sensitive in the observation of a band-stop filter observed in natural light to the spectral offset of the absent spectral band. Characteristic yellow or violet colored effects can thus be obtained.

A number of checking modes are then possible for a document secured by means of an optical security component according to the invention.

Figure 2A:
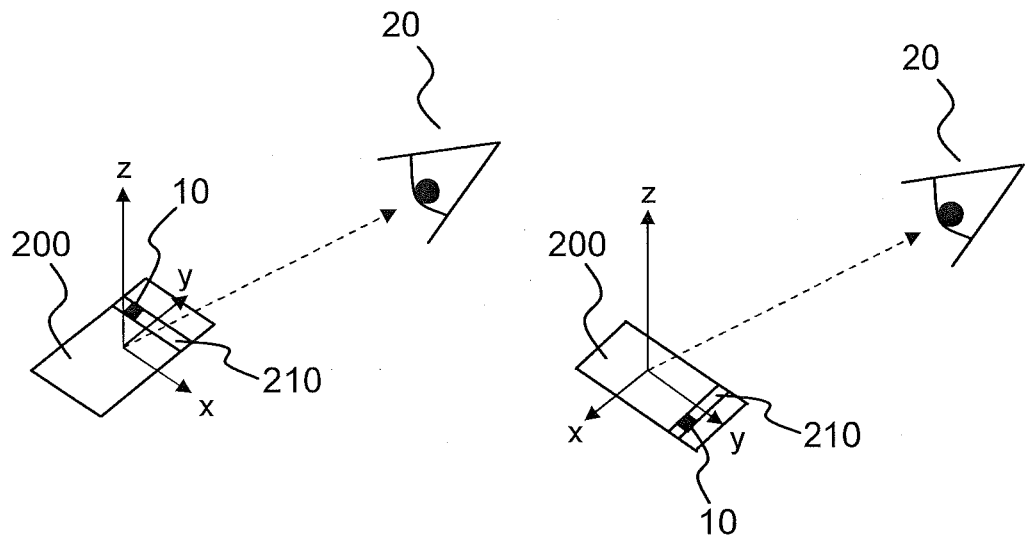
FIGS. 2A and 2B, diagrams illustrating two checking modes for an optical security component according to the invention.
Figure 2B:
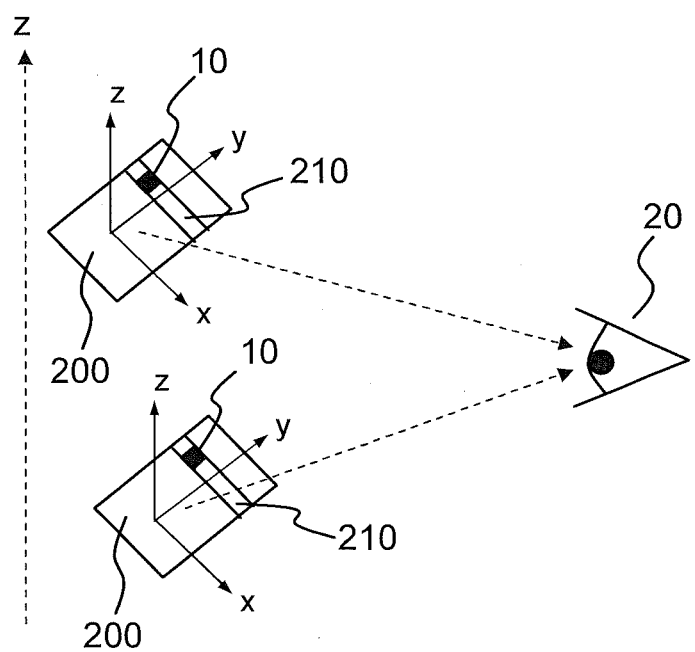

FIGS. 2A and 2B illustrate two checking modes, respectively by rotation and by translation, for a secured document 200, comprising a security element 210 with, notably, an optical security component 10 according to the invention.

FIG. 2A illustrates a first checking mode based on an azimuthal rotation of 90° of the document, leading to a variation of the spectrum of the reflected radiation. For example, the pitch of the grating in each of the directions will be able to be different, the central coupling wavelengths (given by the equations (3) and (5)) varying in one or other of the directions. Consequently, an azimuthal rotation of 90° will lead to a variation of the central coupling wavelengths, as defined previously, for the radiation in TM mode and/or incident TE mode, as well as a variation of the diffraction conditions and therefore of the energy distribution of the non-coupled part of the spectrum and therefore a variation of the observed color, allowing an easy checking mode for the optical security component.

FIG. 2B illustrates a second checking mode based on an axial translation of the document (translation along the axis z at right angles to the plane of the grating). The axial translation of the document leads to a variation of the angle of incidence and therefore of the coupling wavelength. Once again, the result for an observer is a variation of the spectrum of the reflected radiation.

According to a variant, the optical security component may comprise an area in which the metallic layer is not structured. The variation of colors in the structured area will be all the more characteristic when, in another area, the color does not vary.

FIGS. 3 to 6 illustrate exemplary embodiments of an optical security component according to the invention, preferentially suited to a check based on an azimuthal rotation of the component (FIGS. 3 to 5) or to a check based on an axial translation of the component (FIG. 6).

According to these examples, the metallic layer of the optical security component is structured to form, in a first area, a first two-dimensional grating and, in a second area, a second two-dimensional grating. Advantageously, said first and second areas form complementary patterns. By choosing the pitch in each of the directions of each of the gratings, it is possible to create noteworthy optical effects, as is described in more detail below.

Figure 3A:
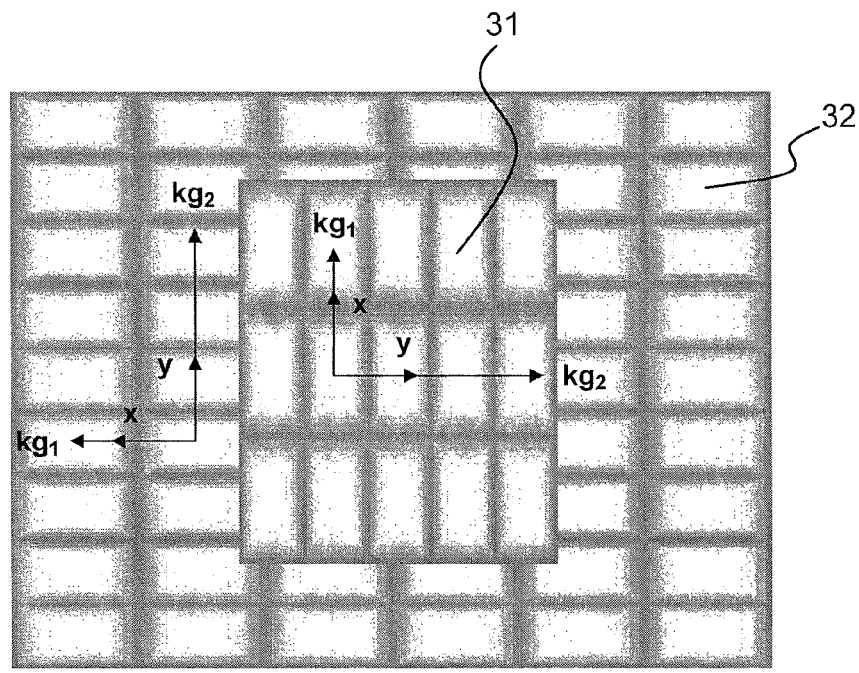
FIGS. 3A and 3B, diagrams illustrating a first embodiment of an optical security component according to the invention and the illustration of the optical effect produced according to an exemplary implementation.
Figure 3B:
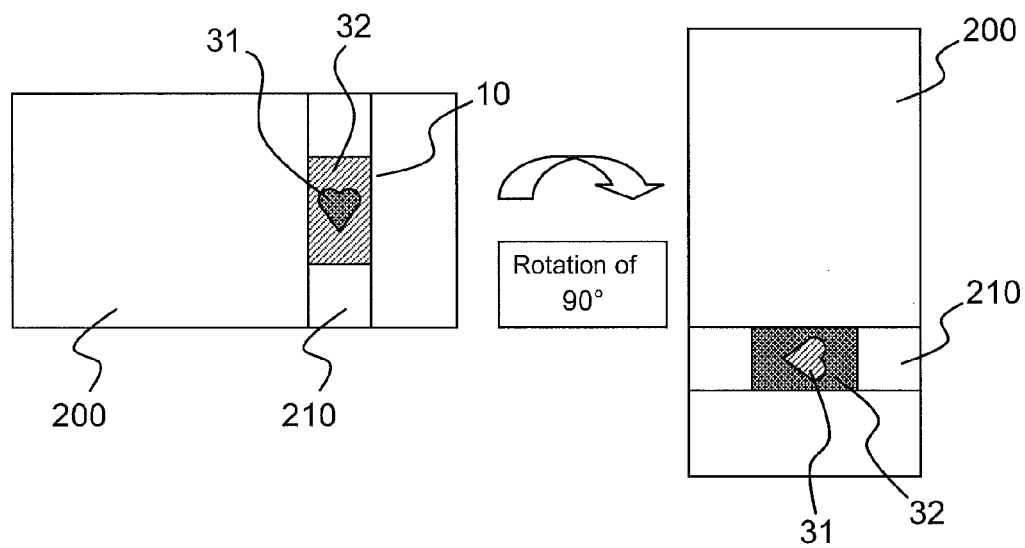

FIG. 3A shows a (partial) plan view of an optical security component in which the metallic layer is structured to form two gratings with two dimensions, denoted 31 and 32. The gratings are each characterized by two grating vectors $k_{g1}$ and $k_{g2}$ as defined previously, with directions at right angles to one another and of different norms, defining, in each direction, a central coupling wavelength. In this example, the directions of the grating vectors of the two gratings 31 and 32 are parallel, the norms of the grating vectors of the grating 31 in the first and in the second direction being equal to those of the grating vectors of the grating 32 in each of the directions at right angles. Advantageously, as is illustrated in FIG. 3B, the gratings 31 and 32 are arranged on areas having complementary patterns. Such an optical security component exhibits the following noteworthy optical effects, illustrated in FIG. 3B. When it is observed from a first direction, corresponding to a nil azimuth relative to a first grating vector of one of the gratings, for example corresponding to a nil azimuth relative to the grating vector $k_{g1}$ of the grating 31, an observer will see the area corresponding to said first grating with a color resulting from the wave reflected after absorption in the metallic layer of a spectral band centered on central coupling wavelengths $\lambda_{11}$, $\lambda_{12}$ determined from pitches of the grating $\Lambda_1$ in the direction of the grating vector $k_{g1}$, according to the equation 3 and from the pitch of the grating $\Lambda_2$ in the direction of the grating vector $k_{g2}$, according to the equation 4. A complementary area 32 will be seen in a different color, resulting from the wave reflected after absorption in the metallic layer of a spectral band centered on the coupling wavelengths $\lambda_{22}$, $\lambda_{21}$ determined respectively from the pitch of the grating $\Lambda_2$ of grating vector $k_{g2}$ according to the equation 3 and of the grating $\Lambda_1$ of grating vector $k_{g1}$ according to the equation 4. When an azimuthal rotation of 90° of the document 200 in which the optical security component 10 is arranged is performed (see FIG. 3B), the new direction of observation will correspond to a nil azimuth relative to the grating vector $k_{g2}$ of the grating 31 and relative to the grating vector $k_{g1}$ of the grating 32. There will therefore be a reversal of the colors between the two areas.

Figure 4A:
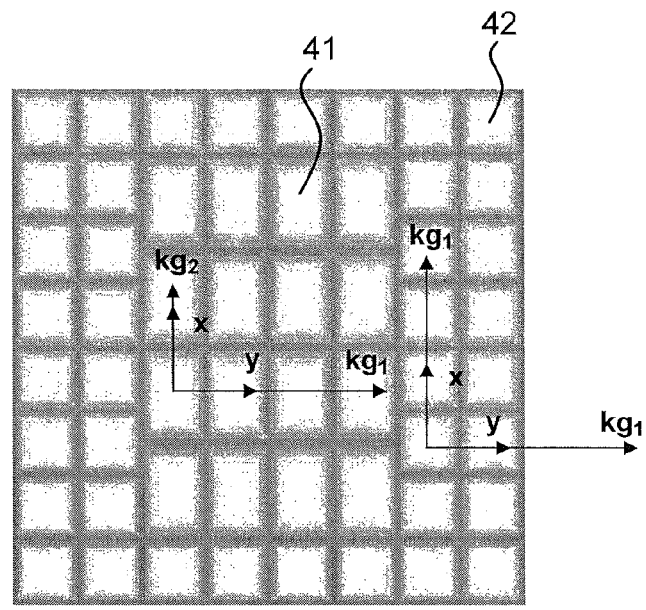
FIGS. 4A and 4B, diagrams illustrating a second embodiment of an optical security component according to the invention and the illustration of the optical effect produced according to an exemplary implementation.
Figure 4B:
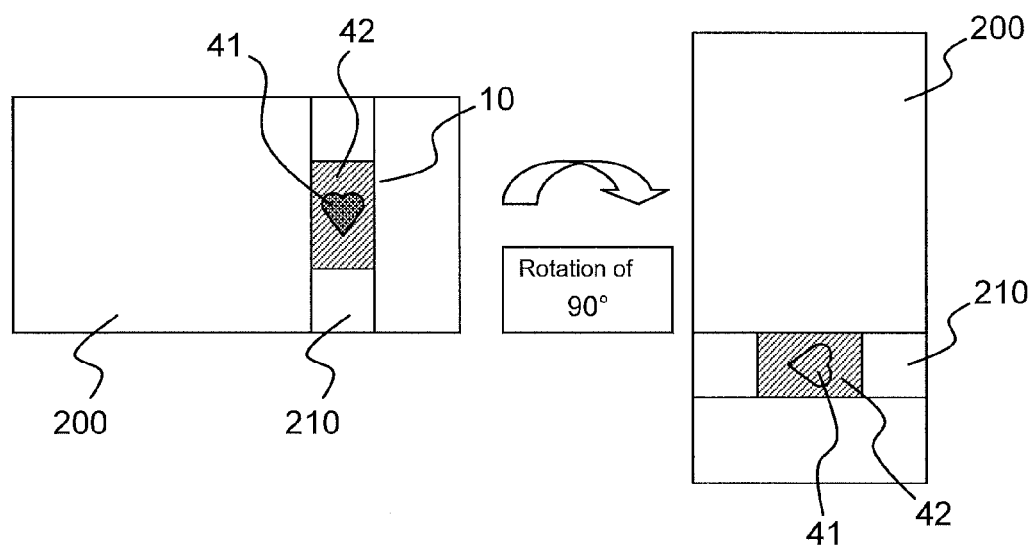

FIGS. 4A and 4B illustrate a second example similar to that of FIGS. 3A and 3B, notably with a first grating 41 having first and second grating vectors of directions at right angles to one another and of norms $k_{g1}$ and $k_{g2}$ respectively, but in which the second grating 42 has an identical pitch in each of the directions, this pitch being identical to the pitch of the grating 41 in one direction. In other words, in this example, the grating vector of the grating 42 in one direction (in this example $k_{g1}$) is equal to one of the grating vectors of the grating 41 whereas the other grating vector of a direction at right angles has the same norm. Such an optical security component exhibits the following noteworthy optical effects, illustrated in FIG. 4B. When it is observed from a first direction corresponding to a nil azimuth relative to the grating vector $k_{g2}$ of the grating 41, an observer will see the area corresponding to said first grating with a first color and the complementary area 42 in a different color, the direction of observation corresponding to a nil azimuth relative to the grating vector $k_{g1}$ of the grating 42. When an azimuthal rotation of 90° of the document 200 in which the optical security component 10 is arranged is performed (see FIG. 4B), the new direction of observation will correspond to a nil azimuth relative to the grating vector $k_{g1}$ of the grating 41 and relative to the grating vector $k_{g1}$ of the grating 42. There will therefore be a disappearance of the pattern formed by the grating 42, the observer seeing only a single color.

Figure 5A:
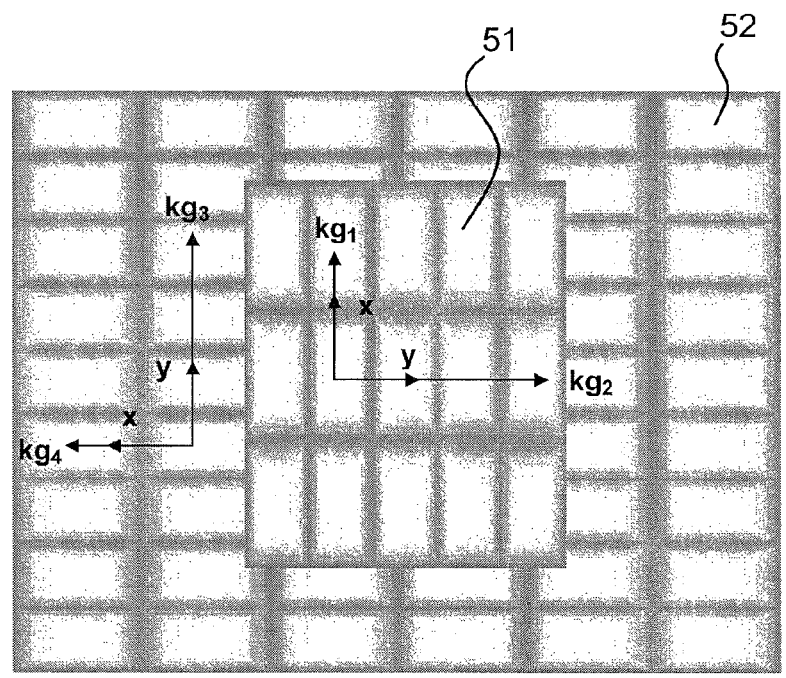
FIGS. 5A and 5B, diagrams illustrating a third embodiment of an optical security component according to the invention and the illustration of the optical effect produced according to an exemplary implementation.
Figure 5B:
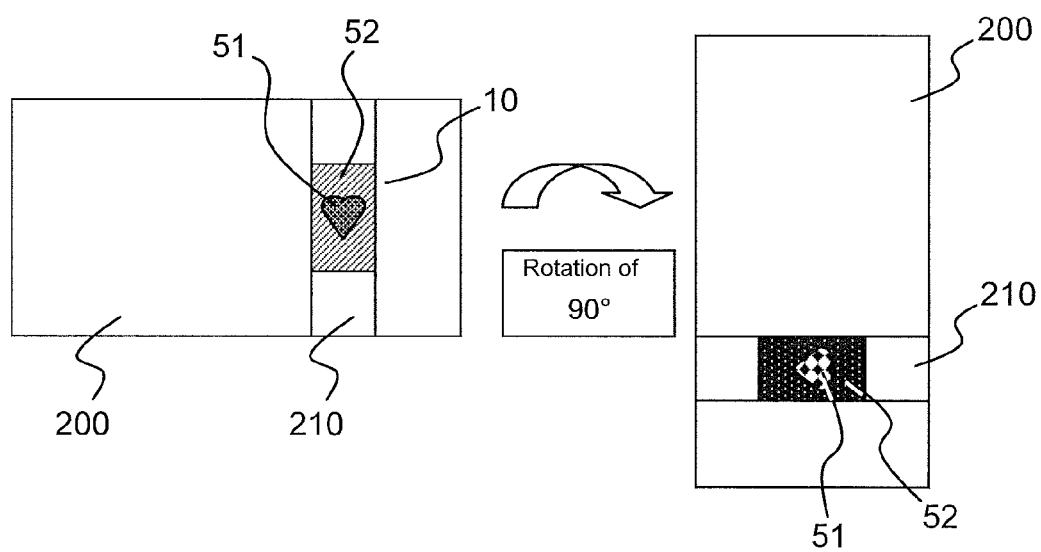

FIGS. 5A and 5B illustrate a third example similar to that of FIGS. 3A and 3B, notably with a first grating 51 having first and second grating vectors $k_{g1}$ and $k_{g2}$ of directions parallel respectively to those of the grating vectors $k_{g3}$ and $k_{g4}$ of the second grating 52 but of different norms. Such an optical security component exhibits the following noteworthy optical effects, illustrated in FIG. 5B. When it is observed from a first direction corresponding a nil azimuth relative to the grating vector $k_{g1}$ of the grating 51, an observer will see the area corresponding to said first grating with a first color and the complementary area 52 in a different color, the direction of observation corresponding to a nil azimuth relative to the grating vector $k_{g4}$ of the grating 52. When an azimuthal rotation of 90° of the document 200 in which the optical security component 10 is arranged is performed (see FIG. 5B), the new direction of observation will correspond to a nil azimuth relative to the grating vector $k_{g2}$ of the grating 51 and relative to the grating vector $k_{g3}$ of the grating 52. There will therefore be a change of colors both of the pattern formed by the area 51 and of the background formed by the area 52.

Figure 6A:
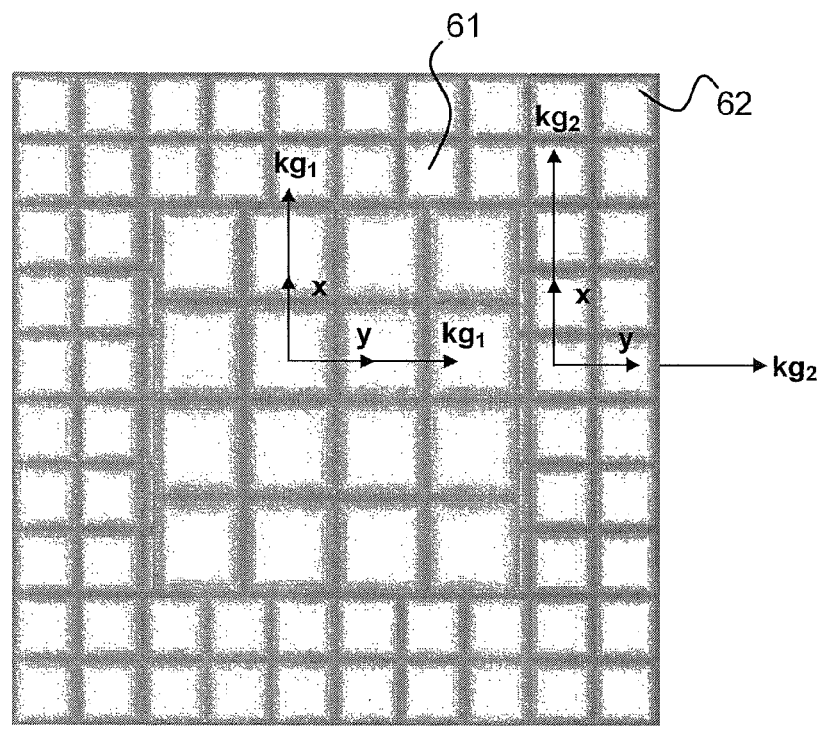
FIGS. 6A and 6B, diagrams illustrating a fourth embodiment of an optical security component according to the invention and the illustration of the optical effect produced according to an exemplary implementation.
Figure 6B:
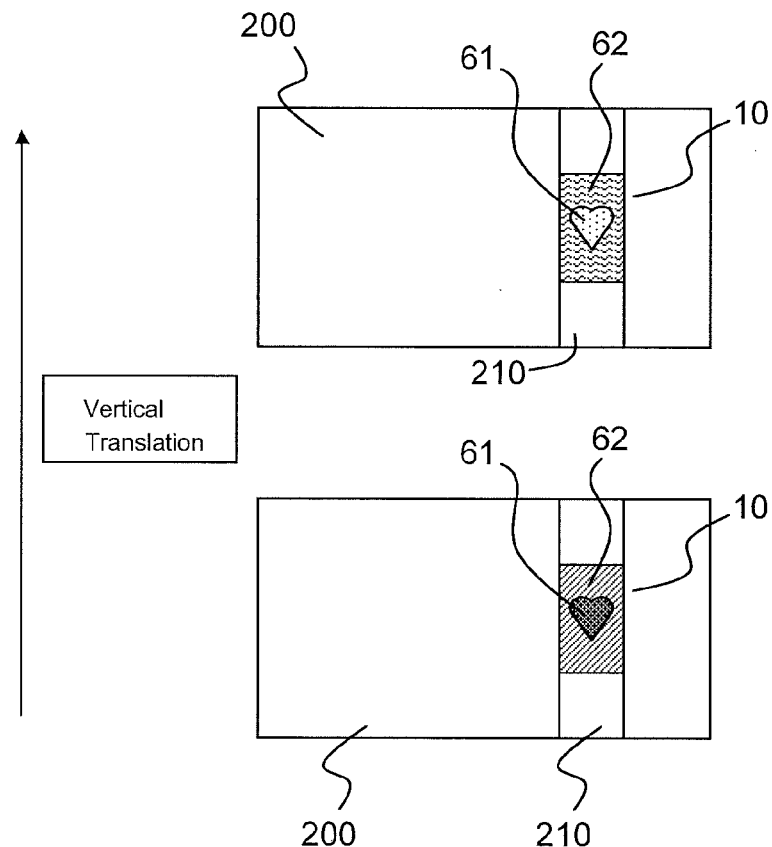

In the fourth example illustrated in FIGS. 6A and 6B, the two two-dimensional gratings 61 and 62, which are symmetrical, each have identical pitches in both directions. In other words, the grating vectors for each of the gratings have directions at right angles to one another but of identical norms. In this example, the grating 61 thus has, in each direction, a grating vector of norm $k_{g1}$ and the grating 62 has, in each direction, a grating vector of norm $k_{g2}$. Such an optical security component exhibits the following noteworthy optical effects, illustrated in FIG. 6B. When it is observed from a first incidence corresponding to a given axial position of the document relative to an observer, the observer will see the area 61 with a first color and the complementary area 62 in a different color. When an axial translation of the document 200 in which the optical security component 10 is arranged is performed (see FIG. 6B), the new position will correspond to a different angle of incidence. There will therefore be a change of colors both of the pattern formed by the area 61 and of the background formed by the area 62.

The security components as described previously can be produced as follows. The optical structures (undulations) of the different areas are recorded by photolithography or electron beam lithography on a photosensitive support or "photoresist". A galvanoplasty step is used to transfer these optical structures into a resistant material, for example based on nickel, to produce the die or "master". A stamping operation is performed from the die to transfer the microstructure onto a film and structure the layer of dielectric material 101 (FIG. 1A), typically a stamping lacquer a few microns thick borne by a 12 μm to 50 μm film of polymer material, for example of PET (polyethylene terephthalate). The stamping may be done by hot pressing of the dielectric material ("hot embossing") or by molding then cross-linking ("UV casting"). The refractive index of the layer formed by the stamping lacquer is typically 1.58. The duly embossed layer is then metalized. The metallization is done in a vacuum, for example, one of the following metals: silver, aluminum, gold, chrome, copper. A coverlayer is then applied, for example by a coating method. For some applications, such as the self lamination of or hot marking, this layer may be the adhesive layer. The coverlayer, which forms the layer 103 (FIG. 1A) typically has a thickness of between 1 and 5 μm for a simple coverlayer and between 2 and 70 μm for a coverlayer acting as adhesive layer. Depending on the final destination of the product, an adhesive may be applied to the coverlayer. According to a variant, a separation layer (for example a wax) may be applied between the stamping lacquer 101 and the PET support film. The security element is transferred to the document by hot pressing the security element onto the document, the plasmonic component being located facing the document. During the transfer, the adhesive film bonds to the document and the separation layer as well as the support film are removed.

Figure 7A:
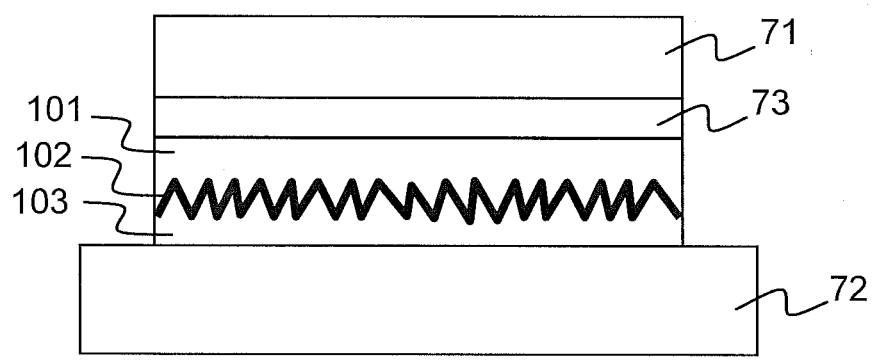
FIGS. 7A, 7B, examples of optical security components according to the invention arranged on a substrate of a secured document or product.
Figure 7B:
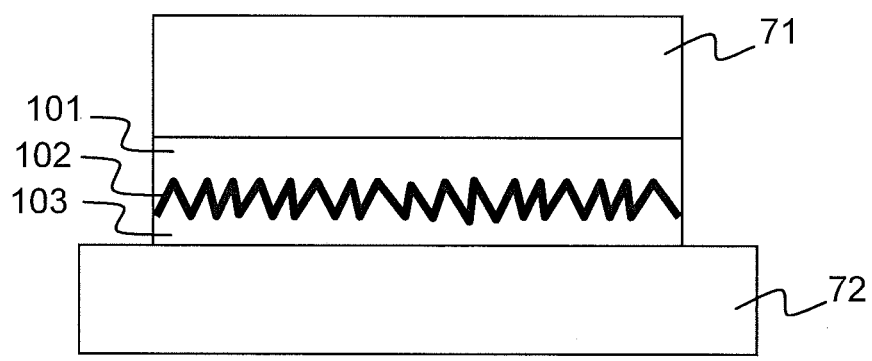

FIGS. 7A and 7B thus schematically represent a (partial) cross-sectional view of components thus obtained according to two exemplary embodiments, these components being intended to be glued onto a substrate 72.

In the example of FIG. 7A, the optical security component comprises the structured metallic layer 102 forming, with the transparent layer 101 of dielectric material, a metal-dielectric interface. It also comprises a coverlayer 103 in contact with the metallic layer 102—in this example, the coverlayer is the layer of thermo-reactivatable adhesive, and a support film 71, for example of PET, a few tens of microns thick, typically between 10 μm and 40 μm for example. It also comprises a separation layer 73 between the support layer 71 and the layer of dielectric material 101 making it possible to remove the support 71 and separation 73 layers at the time of the hot transfer. Such an optical security component is particularly well suited to the securing of a document comprising a paper-type substrate 72.

In the example of FIG. 7B, the optical security component is of "label" type. It comprises the same layers as that represented in FIG. 7A but, in this example, the coverlayer 103 is a layer of permanent adhesive, and there is therefore no longer any separation layer. The support film 71, for example of PET, is slightly thicker, typically between 10 μm and 50 μm. This component is, for example, suitable for gluing onto a packaging-type substrate.

According to a variant, it is possible, at the time of the metallization step, to apply several different metals, for example to seek different visual effects. For this, it will be possible, for example, to apply, with a given pattern, a soluble ink onto the embossed layer. During the metallization with the first metal, the latter is applied uniformly onto the layer, but remains only on the areas where there is no ink when the ink is removed. Then, a second selective metallization is performed, also comprising a prior soluble ink printing step making it possible to select the areas of application of the second metal.

According to a variant, the different metallic areas may correspond to different gratings. In other words, the first metal is applied to one or more first coupling area(s) corresponding to one or more of said two-dimensional gratings, whereas the second metal is applied to one or more other second coupling area(s) corresponding to one or more other two-dimensional gratings, allowing for distinct colored effects in the different coupling areas. Alternatively, the different metals may be deposited in areas which do not correspond to different gratings.

As emerges in light of the exemplary fabrication method described above, the inclusion of an optical security component according to the invention in a secured document is perfectly compatible with the presence in the same document of structures based on gratings usually used to produce holographic components.

In particular, it will be possible to produce an optical security element comprising one or more components of plasmonic type as described previously, possibly with one or more other types of optical security components, for example of holographic type and, for example, of DOVID type.

For this, a die will be able to be produced by recording the different patterns corresponding to the different optical security components on the photoresist support followed by galvanoplasty. The stamping can then be performed from the die to transfer the different microstructures onto the film of polymer material, intended for the embossing. The metallization for the components with plasmonic effect will be able to be done on all of the film, because it will not disturb the other components of DOVID type also operating in reflection mode. According to a variant, the metal is deposited selectively on each of said optical security components with plasmonic effect, revealing the non-metallized areas on the optical security element. This makes it possible, for example, to further emphasize the optical effects of said components and/or reveal the substrate of the document or of the object to be secured in the form of non-metallized patterns. The selective metallization may be obtained by a first step of deposition of a metallic layer on all of the structured film then by partial demetallization to form said non-metallized areas.

The duly obtained secured document can very easily be checked by a user with little experience and with high reliability. As has been shown, the optical security component of plasmonic type produced according to the invention will be able to take the form of a security film whose characteristics can be checked by the eye in the visible spectrum. A visual authentication of the secured document is therefore possible, including in natural light. This authentication, based on different reflection mode visual effects depending on the axis of rotation of the component and/or translation, is particularly easy to perform.

In practice, an observer will be able to check the secured document by observing, in direct reflection mode, the component of plasmonic type under a white light source.

Although described through a certain number of exemplary embodiments, the optical security component according to the invention and the method for fabricating said component comprise different variants, modifications and refinements which will appear obvious to a person skilled in the art, given that these different variants, modifications and refinements fall within the scope of the invention as defined by the following claims.

The invention claimed is:

1. An optical security component observable in a spectral band between 380 and 780 urn and in direct reflection mode, comprising:
   a layer of dielectric material, transparent in said observation spectral band; and
   a continuous metallic layer forming, with said layer of dielectric material, a metal-dielectric interface, wherein:
      said continuous metallic layer has a sufficient thickness to allow the reflection of the incident light on said interface in the observation spectral band with a maximum residual transmission as a function of the wavelength of 2%; and
      said continuous metallic layer is structured to form, in a first coupling area, two sets of undulations, having a sinusoidal or quasi-sinusoidal profile, extending in two first directions and forming a first two-dimensional grating, of subwavelength periods in each of the first directions,
      wherein a depth of the two-dimensional grating is constant and is between 10% and 50% of said periods, and
      wherein the periods in each first direction are determined for optimizing the coupling of an incident wave having at least a first wavelength comprised in said spectral band with a plasmonic mode that is propagated on the metal-dielectric interface,
      wherein said first coupling area exhibits a color effect when the component is observed in reflection with the naked eye.

2. The optical security component as claimed in claim 1, in which said two first directions are at right angles to one another.

3. The optical security component as claimed in claim 2, in which the periods in each first direction are different.

4. The optical security component as claimed in claim 2, in which the periods in each first direction are identical.

5. The optical security component as claimed in claim 1, wherein said continuous metallic layer is structured to form, in a second coupling area distinct from the first coupling area, two sets of undulations, having a sinusoidal or quasi-sinusoidal profile, extending in two second directions and forming a second two-dimensional grating of subwavelength periods in each of the second directions.

6. The optical security component as claimed in claim 5, in which said first and second coupling areas form complementary patterns.

7. The optical security component as claimed in claim 5, wherein the period in one first direction of the first two-dimensional grating is identical to the period in one second direction of the second two-dimensional grating.

8. The optical security component as claimed in claim 5, wherein the periods in the first and the second first directions of the first two-dimensional grating are identical and the period in one second direction of the second two-dimensional grating is identical to said period of the first grating.

9. The optical security component as claimed in claim 1, wherein at least a part of the metallic layer is formed of aluminum and has a thickness greater than 30 nm.

10. The optical security component as claimed in claim 1, wherein the metallic layer comprises at least two parts each formed of a different metal.

11. The optical security component as claimed in claim 1, further comprising a cover layer in contact with said metallic layer on a face opposite said metal-dielectric interface.

12. An optical security element for securing a document or an object and comprising at least one optical security component as claimed in claim 1.

13. The optical security element as claimed in claim 12, further comprising one or more non-metalized areas.

14. A secured document or product comprising a substrate and an optical security element as claimed in claim 12, fixed onto said substrate.

15. A method for fabricating an optical security component observable in a spectral band between 380 and 780 nm and in direct reflection mode, said method comprising:
   providing a layer of dielectric material, transparent in said observation spectral band, and the structuring of said layer of dielectric material to form, in a first coupling area, two sets of undulations, having a sinusoidal or quasi-sinusoidal profile, extending in two directions and forming a first two-dimensional grating, of subwavelength periods in each of the directions,
   wherein a depth of the two-dimensional grating is constant and between 10% and 50% of said periods,
   wherein said first coupling area exhibits a color effect when the component is observed in reflection with the naked eye, and
   depositing a continuous metallic layer on said layer of dielectric material to form, with said layer of dielectric material, a structured metal-dielectric interface, said metallic layer having a sufficient thickness to allow the reflection of the incident light on said interface in the observation spectral band with a maximum residual transmission as a function of the wavelength of 2%,
      wherein the periods in each direction are determined for optimizing the coupling of an incident wave having at least a first wavelength comprised in said spectral band with a plasmonic mode that is propagated on the metal-dielectric interface.

16. The method as claimed in claim 15, wherein said metallic layer is covered on a face opposite said structured metal-dielectric interface by a cover layer.

* * * * *